United States Patent [19]
Goerler

[11] 3,858,325
[45] Jan. 7, 1975

[54] COMBINED DIAMETER AND THREAD GAUGE

[75] Inventor: Ronald B. Goerler, Oyster Bay, N.Y.

[73] Assignee: Crest/Good Manufacturing Company, Inc., Long Island, N.Y.

[22] Filed: June 29, 1972

[21] Appl. No.: 267,354

[52] U.S. Cl.............................. 33/199 R, 33/178 B
[51] Int. Cl. .............................................. G01b 3/36
[58] Field of Search ........... 33/199 R, 168 R, 178 B

[56] References Cited
UNITED STATES PATENTS

| | | | |
|---|---|---|---|
| 447,475 | 3/1891 | Pomeroy | 33/178 B |
| 2,528,431 | 10/1950 | Greenberg | 33/199 R |
| 2,728,145 | 12/1955 | Holladay | 33/178 B |
| 2,830,380 | 4/1958 | Rumonoski | 33/199 R |
| 3,218,724 | 11/1965 | Schaumberger | 33/199 R |

Primary Examiner—Louis R. Prince
Assistant Examiner—Richard R. Stearns
Attorney, Agent, or Firm—Steinberg & Blake

[57] ABSTRACT

A gauge for identifying the diameter and threads of an elongated member. The gauge consists of a plate formed with an elongated tapered slot along which the member to be identified can be moved for determining the diameter of the member. At different regions along the slot the plate is formed with a plurality of internally threaded openings with several openings at each region all having the same diameter but different threads, so that when a region corresponding to the diameter of a member to be identified is determined, an attempt is made to thread the member into the different openings at the region corresponding to the diameter of the member until that opening is found which has threads matching those of the member to be identified. The diameters of the openings at the several regions are indicated on the gauge as well as the number of threads per inch of the several openings, so that when a member to be identified is successfully threaded into a given opening there is an indication of the diameter of the member and the threads per inch thereof.

1 Claim, 4 Drawing Figures

Patented Jan. 7, 1975
3,858,325
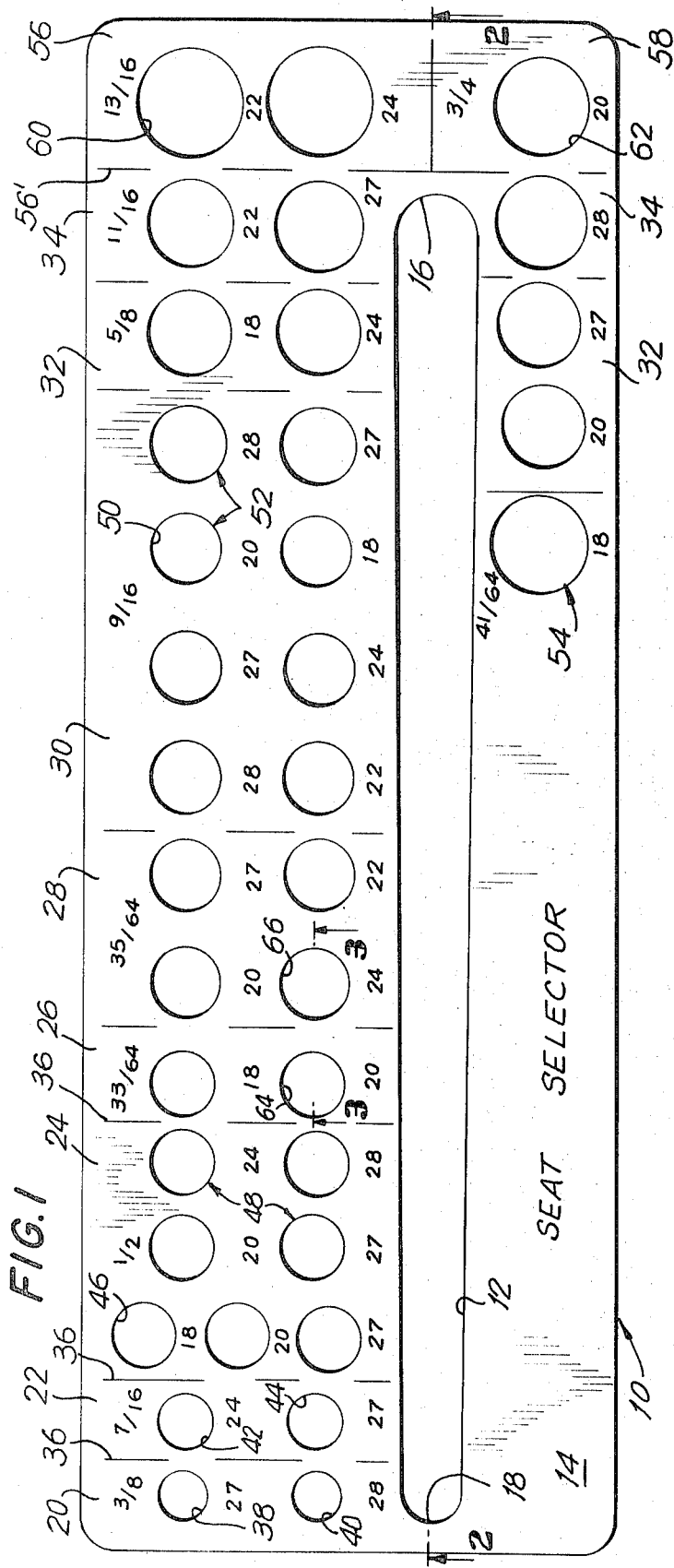
FIG. 1
FIG. 2
FIG. 3
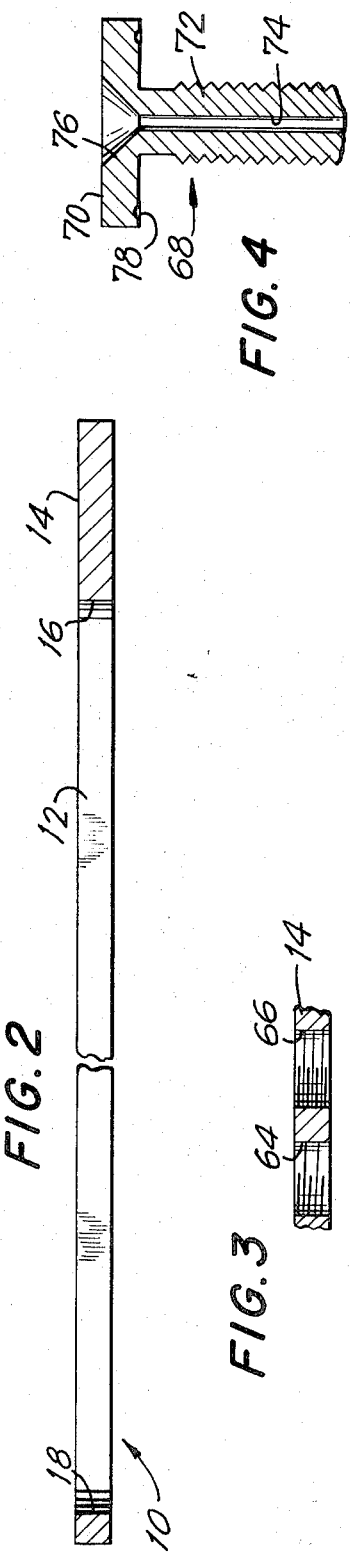
FIG. 4

3,858,325

COMBINED DIAMETER AND THREAD GAUGE

BACKGROUND OF THE INVENTION

The present invention relates to gauges.

In particular, the present invention relates to gauges for identifying externally threaded elongated members.

In certain fields it is customary to have components of different sizes which are identified by the diameters of elongated parts of the components and threads on these elongated parts.

For example in the case of faucets which are commonly encountered in household sinks, it is necessary from time to time to replace worn valve seats. Such valve seats are commonly identified by the diameter of an elongated threaded portion thereof and a number of threads per inch at the threaded portion. However, when a worn valve seat of this type is removed it is often impossible to identify it because the identification numbers originally impressed on the valve seat component are worn away. Under these conditions it is necessary for a plumber or other individuals to go through a tedious process of trial and error until a valve seat component of the proper size is found to replace the worn component.

SUMMARY OF THE INVENTION

It is accordingly a primary object of the present invention to provide a gauge which will avoid the necessity of tedious trial and error as referred to above.

In particular, it is an object of the invention to provide a gauge which can be used for quickly and conveniently identifying not only the diameter but also the threads on a component which is applied to the gauge.

In particular, it is an object of the invention to provide a gauge in the form of a single rugged plate which can easily be carried about and which is provided with suitable indicia for readily identifying a component which is applied to the gauge.

A particular object of the present invention is to provide a gauge of the above type which can be readily used for a large number of components of widely different diameters and threads.

Also, it is an object of the invention to provide a gauge which is capable of quickly identifying the diameter of the component applied to the gauge and which is also capable of quickly identifying the threads on the component.

In accordance with the invention the gauge consists of a plate formed with an elongated tapered slot having at several regions therealong openings arranged in such a way that the openings at any one region are all of the same diameter but have different threads with the diameters of the openings at any one region corresponding to the width of the slot at the latter region. The diameters and threads of the several openings are identified by suitable indicia so that a member which is to be identified can have its elongated threaded portion moved along the slot from the wider toward the narrower end thereof until the member engages the plate at the opposite sides of the slot thereof, so that in this way a region having openings corresponding to the diameter of the member can be readily identified. Then an attempt is made to thread the member into the different openings at the region which has the openings of the same diameter as the member, until the member is successfully threaded into one of the openings, and in this way the indicia on the plate will identify the diameter and the threads on the member. With this information it is possible to select a replacement member without the tedious trial and error previously required for this purpose.

BRIEF DESCRIPTION OF DRAWINGS

The invention is illustrated by way of example in the accompanying drawings which form part of this application and in which:

FIG. 1 is a top plan view of a gauge according to the invention;

FIG. 2 is a longitudinal sectional elevation taken along line 2—2 of FIG. 1 in the direction of the arrows;

FIG. 3 is a fragmentary sectional elevation taken along line 3—3 of FIG. 1 in the direction of the arrows; and FIG. 4 is a sectional elevation of an example of a component which may be applied to the gauge of the invention.

DESCRIPTION OF A PREFERRED EMBODIMENT

Referring now to the drawings, there is shown in FIG. 1 a gauge 10 according to the present invention. This gauge 10 is in the form of a rigid plate made of any suitable metal or plastic. The plate 10 may also be made up of laminations of fabric impregnated with plastic to form a relatively rigid strong plate, as is well known.

In accordance with one of the features of the present invention the plate 10 is formed with an elongated tapered slot 12 passing therethrough and arranged as illustrated in FIG. 1. As is apparent from FIG. 2, which shows the plate in section in a plane which contains the central axis of the slot 12, the plate 14 which forms the gauge 10 has a substantial thickness which may be on the order of one-fourth inch. The elongated tapered slot 12 has a wide end 16 which in the illustrated example has a width of eleven-sixteenths inch, and the tapered slot 12 has an opposed narrow end 18 which has a width of three-eighths inch in the illustrated example.

From the narrow end 18 toward the wide end 16 of the tapered slot 12 the plate 14 of the gauge 10 has a plurality of regions 20, 22, 24, 26, 28, 30, 32, and 34 which are distributed along the slot at portions thereof which have different widths. These regions are respectively situated along those portions of the slot which have widths of three-eighths inch, seven-sixteenths inch, one-half inch, thirty-three sixty-fourths inch, thirty-five sixty-fourths inch, nine-sixteenths inch, five-eighths inch, and eleven-sixteenths inch. These widths of the different portions of the slot at the several regions therealong are indicated by suitable indicia situated along the top edge of the plate, as viewed in FIG. 1. The several regions along the slot are separated from each other by lines 36 which are marked on the surface of the plate in any suitable way as by being printed or impressed thereon.

The region 20 which is located at the narrow end 18 of the slot 12 has a pair of openings 38 and 40 each of which has a diameter of three-eighths inch, the openng 38 being internally threaded with a thread which has 27 threads per inch while the opening 40 is internally threaded with threads having 28 threads per inch. The next region 22 is situated at that part of the slot 12 which has a width of seven-sixteenths inch, and this region 22 is provided with a pair of openings 42 and 44 each of which has a diameter of seven-sixteenths inch, with the opening 42 being internally threaded with 24 threads per inch while the opening 44 is internally threaded with 27 threads per inch.

The next region 24 is situated on that part of the slot 12 which has a width of one-half inch. Inasmuch as components of a diameter of one-half inch are very frequently encountered with a number of different threads per inch, this region 24 has a relatively large number of openings 46 all of which have a diameter of one-half inch but the several openings are provided with different numbers of threads per inch, as indicated by the indicia 48, with some of the openings being identical. Thus it will be noted that among the openings 46 are a few openings having 27 threads per inch and a few having 20 threads per inch, since these are sizes which are very frequently encountered. It will be noted that the region 30 which is situated at that part of the slot 12 which has a width of nine-sixteenths inch also has a relatively large number of openings 50 all of which have a diameter of nine-sixteenths inch and these openings also are provided with the different internal threads as indicated by the indicia 52. Thus, these diameters of one-half inch and nine-sixteenths inch are the most frequently encountered diameters and have the largest numbers of internally threaded openings at the gauge. The remaining regions 26, 28, 32, and 34 have the openings and threads indicated by the indicia apparent from FIG. 1.

It is to be noted that not all of the regions are situated on only one side of the slot 12. Thus, the region 34 has two openings of 22 and 27 threads per inch and eleven-sixteenths inch diameter situated on one side of the slot 12 while this region 34 has an additional opening of eleven-sixteenths inch diameter and 28 threads per inch situated at the other side of the slot, as is apparent from FIG. 1. In the same way, the region 32 has four openings all of which have a five-eighths inch diameter with the two openings on one side of the slot having threads of 18 and 24 threads per inch while the two openings on the other side of the slot have threads of 20 and 27 threads per inch. Through this arrangement it is possible to distribute the openings economically with respect to the area of the gauge while maintaining the latter at a minimum size and still having relatively large number of different openings.

A member having a diameter of forty-one sixty-fourths inch is relatively rare, and such a member will usually have only 18 threads per inch. Therefore the opening having this latter diameter with 18 threads per inch is situated by itself just to the left of the region 32 situated at the lower side of the slot 12, as viewed in FIG. 1. The width of the slot 12 which corresponds to forty-one sixty-fourths inch will be situated between the regions 32 and 34 approximately at the line between these regions 32 and 34, so that when a member engages the opposite sides of the slot 12 approximately at this line it will be known that this member might possibly fit the opening 54.

At the right end of the plate 14, as viewed in FIG. 1, there are a pair of regions 56 and 58 which correspond to diameters greater than the maximum width of the slot 12 at its end 16. Thus, at the end 16 the slot 12 has a width of eleven-sixteenths inch, while the region 56 has openings of thirteen-sixteenths inch diameter and the region 58 has an opening of three-fourths inch diameter. Relatively large components of the sizes indicated in the regions 56 and 58 are seldom encountered, so that when a component is found too big to be received even at the widest end 16 of the slot 12, the operator will try either the pair of openings 60 of the region 56 which respectively have 22 and 24 threads per inch or the opening 62 of the region 58 which has 20 threads per inch.

FIG. 3 illustrates fragmentarily in section that part of the plate 14 which has the internally threaded openings 64 and 66 of the regions 26 and 28.

It is apparent that the above-described gauge 10 of the invention can be used for identifying any elongated externally threaded members having a size range within the capacity of that of the gauge. However, the particular gauge of the invention is especially suited for use in identifying valve seat components 68 of the type illustrated in FIG. 4, so that the gauge of the invention is designated as a seat selector, as indicated in FIG. 1. Referring to FIG. 4, a conventional valve seat component 68 will have a flange 70 of hexagonal configuration, for example, so that it can be removed with a suitable wrench, and this component has an elongated externally threaded portion 72 formed with the axial bore 74 which communicates with the valve seat proper 76 against which a valve member presses when the valve is closed. The lower surface of flange 70 may be formed with an annular groove 78 for an O-ring, as is well known.

When the valve seat 76 becomes sufficiently worn, it will be impossible to tightly close the valve, so that the component 68 must be replaced. However when a valve seat component is worn to such an extent, any identifying indicia originally impressed thereon is very likely also to be worn away, so that ordinarily a plumber will go through a considerable tedious trial and error process in order to find a proper replacement.

In contrast, with the invention the plumber can immediately place the portion 72 in the slot 12, moving this portion from the wider end 16 toward the narrow end 18 until the portion 72 can no longer be moved along the slot 12. At this point the portion 72 will be located opposite one of the regions 22, 24, 26, for example, indicating immediately the diameter of the portion 72. If, for example, the portion 72 stops along the slot 12 at the region 22, then the operator will know that the replacement part must have a diameter of seven-sixteenths inch at its threaded portion 72, and now the operator need only try to thread the component 72 either in the opening 42 or in opening 44 to determine whether this component has at its portion 72 24 threads per inch or 27 threads per inch. Upon successfully threading portion 72 through one of the openings 42 or 44, the operator will be able to identify the component 68 as being a component of seven-sixteenths inch diameter and either 24 or 27 threads per inch, and thus the operator will immediatley know how to select a proper replacement part. In the same way different components may be tested with the gauge of the invention for quickly identifying a proper replacement part.

What is claimed is:

1. A gauge for identifying an elongated externally threaded member, comprising an elongated plate having opposed ends and formed with an elongated tapered slot extending longitudinally of said plate and terminating adjacent but short of the opposed ends of the plate and having along said slot a plurality of regions each of which is formed with a plurality of internally threaded openings with the openings of each region having a diameter equal to the width of the slot at the location of each region therealong, and the openings of each region having different numbers of threads per inch, so that an elongated externally threaded member can be moved along said slot from the wider toward the narrower end thereof until the member cannot move further along the slot for identifying a region having openings of the same diameter as that of said member, and so that said member can then be selectively introduced into the openings at the region whose openings equal the diameter of said member until that opening is found which has the same threads per inch as said member, said plate carrying at said regions indicia indicating the diameters of the openings of the several regions and indicating the number of threads per inch of the openings at each region, so that when the member is successfully threaded into a given opening, an identification is made of the diameter of the member and the number of threads per inch thereof, said plate carrying lines separating the several regions from each other, and said lines extending along said plate on opposite sides of said slot with openings of a given region being situated between said lines on opposite sides of said slot, one region with all of the openings thereof being situated on only one side of the slot while the next region with all of the openings thereof is situated in part on one side and in part on the other side of said slot, said gauge including a plurality of openings respectively having diameters which do not correspond to the width of any part of the slot so that a member which cannot be accommodated in the slot between opposed side edges thereof and between the opposed ends thereof and having a diameter and thread pitch corresponding to one of said plurality of openings can be identified by one of the latter openings, said openings which have diameters which do not correspond to the width of any part of said slot being of diameters larger than said wider end of said slot and being situated at the region of but beyond said wider end of said slot, said wider end of said slot terminating short of an adjacent end of said plate by a distance great enough to accommodate said openings whose diameters are larger than the wider end of said slot and the latter openings being situated between said wider end of said slot and the adjacent end of said plate.

* * * * *